United States Patent Office 3,178,442
Patented Apr. 13, 1965

3,178,442
PYRIDYL CHROMONES

William Laszlo Bencze, New Providence, N.J., assignor to Ciba Corporation, New York, N.Y., a corporation of Delaware

No Drawing. Filed Apr. 8, 1963, Ser. No. 271,496
11 Claims. (Cl. 260—295)

The present invention relates to and has for its object the provision of new 3-(pyridyl)-chromones, as well as the salts thereof or the quaternary ammonium derivatives of these compounds.

More particularly, it relates to compounds having the following formula:

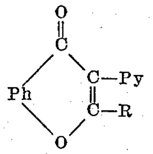

in which Ph is an 1,2-phenylene radical, Py is a pyridyl radical and R is a hydrogen atom or an aliphatic radical, as well as the salts thereof, or the quaternary ammonium derivatives of these compounds, and process for manufacture thereof.

The hexacyclic, carbocyclic aryl portion of the chromone ring system, represented by the 1,2-phenylene radical Ph in the above formula, is unsubstituted or may be substituted by one or more than one of the same or of different substituents at any of the four positions available for substitution. Suitable substituents are, for example, lower alkyl, e.g., methyl, ethyl, n-propyl, isopropyl, n-butyl, isobutyl, secondary butyl, tertiary butyl and the like, substituted lower alkyl, e.g., trifluoromethyl, hydroxyl, etherified hydroxyl, such as lower alkoxy, e.g., methoxy, ethoxy, n-propyloxy, isopropyloxy, n-butyloxy and the like, as well as lower alkylenedioxy, e.g., methylenedioxy, 1,1-ethylenedioxy, 1,2-ethylenedioxy and the like, or esterified hydroxyl, such as acyloxy, for example, lower aliphatic acyloxy, particularly lower alkanoyloxy, e.g., acetyloxy, propionyloxy, pivalyloxy, as well as substituted lower alkanoyloxy, e.g., cyclohexyl-acetyloxy, trimethoxymethyl-acetyloxy and the like, or other acyloxy groups, particularly monocyclic carbocyclic aryl acyloxy, e.g., benzoyloxy, 3,4,5-trimethoxy-benzoyloxy, 3,4-dichloro-benzoyloxy, 3-dimethyl-amino-benzoyloxy, cinnamoyloxy and the like, or halogeno (representing hydroxyl esterified with a hydrohalic acid), e.g., fluoro, chloro, bromo and the like.

Substituted 1,2-phenylene portions of the chromone ring system are represented, for example, by (lower alkyl)-1,2-phenylene, (trifluoromethyl) - 1,2 - phenylene, (hydroxy)-1,2-phenylene, (lower alkoxy)-1,2-phenylene, (lower alkylenedioxy) - 1,2 - phenylene, (halogeno)-1,2-phenylene, lower alkanoyloxy)-1,2-phenylene and the like.

The pyridyl radical at the 3-position of the chromone nucleus, represented by the group Py in the above formula, is primarily 3-pyridyl or 4-pyridyl, as well as 2-pyridyl. It may be substituted for example, by lower alkyl, e.g., methyl, ethyl and the like.

The 2-position of the chromone compounds is preferably unsubstituted, i.e., the radical R in the above formula stands primarily for hydrogen. It may also be substituted by an aliphatic radical, particularly lower alkyl, such as mentioned above, e.g., methyl, ethyl, n-propyl, isopropyl, n-butyl and the like, as well as lower alkenyl, e.g., allyl, methallyl and the like, lower alkynyl, e.g., ethynyl, propargyl and the like carbocyclic aryl-lower alkyl, such as phenyl-lower alkyl, e.g., benzyl, 1-phenylethyl, 2-phenylethyl and the like, carbocyclic aryl-lower alkenyl, such as phenyl-lower alkenyl, e.g., styryl and the like, or any other suitable aliphatic radical.

Salts of the compounds of this invention are acid addition salts, such as pharmaceutically acceptable, non-toxic acid addition salts, with inorganic acids, e.g., hydrochloric, hydrobromic, sulfuric, phosphoric acid and the like, or with organic acids, such as organic carboxylic acids, e.g., formic, acetic, propionic, glycolic, malonic, succinic, maleic, hydroxymaleic, fumaric, malic, tartaric, citric, benzoic, salicylic, 2-acetoxybenzoic, nicotinic, isonicotinic acid and the like, or with organic sulfonic acids, e.g., methane sulfonic, ethane sulfonic, 2-hydroxyethane sulfonic, ethane 1,2-disulfonic, benzene sulfonic, toluene sulfonic, camphor sulfonic acid and the like. Acid addition salts may also serve as intermediates, for example, in the purification of the free compounds or in the manufacture of other acid addition salts, such as the pharmaceutically acceptable, non-toxic acid addition salts, as well as for identification and characterization purposes. Particularly useful salts for the latter are those with acidic organic nitro compounds, e.g., picric, picrolonic, flavianic acid and the like, or with metal complex acids, e.g., phosphotungistic, phosphomolybdic, chloroplatinic, Reinecke acid and the like.

Quaternary ammonium derivatives of the compounds of this invention are those with reactive esters formed by alcoholic compounds and strong acids, such as those with lower alkyl halides, e.g., methyl, ethyl, n-propyl or isopropyl chloride, bromide or iodide and the like, phenyl-lower alkyl halides, e.g., benzyl, 1- phenylethyl or 2-phenylethyl chloride or bromide and the like, di-lower alkyl sulfates, e.g., dimethyl sulfate, diethyl sulfate and the like, lower alkyl lower alkane sulfonates, e.g., methyl or ethyl methane sulfonate or ethane sulfonate and the like, or lower alkyl monocyclic carbocyclic aryl sulfonates, e.g., methyl p-toluene sulfonate and the like. Also included as quaternary ammonium compounds are the quaternary ammonium hydroxides, and other salts with inorganic or organic acids, such as those described above.

The compounds of this invention influence certain functions of the adrenal cortex. Thus, they cause a decrease of the secretion of hydrocortisone (compound F) accompanied by an increase of the secretion of desoxycorticosterone (DOC). In addition to these effects, certain compounds of this invention, particularly those having a 3-pyridyl group, cause an increase of the secretion of corticosterone (compound B), but have only a slightly decreasing or no effect at all on the secretion of 11-desoxy-17$\alpha$-hydroxy-corticosterone (compound S). These compounds appear to be specific inhibitors of the 17$\alpha$-hydroxylase enzyme systems. Others, particularly those having a 4-pyridyl substituent, appear to be specific 11$\beta$-hydroxylase enzyme system inhibitors; in addition to the decrease of the hydrocortisone secretion and an increase of the desoxycorticosterone secretion, they decrease the secretion of corticosterone (compound B) and increase that of 11 - desoxy-17$\alpha$-hydroxy-corticosterone (compound S).

The compounds of the present invention and their derivatives, having such specific effects on the functioning of the adrenal cortex can, therefore, be used as diagnostic tools for the determination of malfunctions of the pituitary gland, as well as in the treatment of conditions associated with adrenal cortical hyperfunction, such as Cushing's syndrome, primary aldosteronism, secondary aldosteronism and the like. Furthermore, preferential inhibition of the 17$\alpha$-hydroxylase enzyme system or of the 11$\beta$-hydroxylase enzyme system makes the compounds of this invention useful as tools in the study of the pathways of the biosynthesis of corticoid hormones in the adrenal glands and in the gonads. The new compounds also exhibit tranquilizing and sedative effects and can, therefore, be used as tranquilizing agents and the like. The compounds of this invention are also useful as intermediates in the preparation of other valuable compounds.

Outstanding pharmacological properties are exhibited by compounds having the following formula:

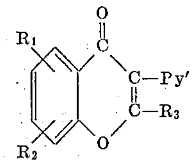

in which each of the groups $R_1$ and $R_2$ is hydrogen, lower alkyl, lower alkoxy, hydroxyl, lower alkanoyloxy, halogeno or trifluoromethyl, $R_3$ stands for hydrogen or lower alkyl, and Py' is pyridyl, especially 3-pyridyl or 4-pyridyl, and their pharmaceutically acceptable, non-toxic acid addition salts. Especially mentioned are 3-(3-pyridyl)-chromone and 3-(4-pyridyl)-chromone, as well as 2-methyl-3-(3-pyridyl)-chromone, 2-methyl-3-(4-pyridyl)-chromone and the like.

The new 3-(pyridyl)-chromones, their salts and the quaternary ammonium derivatives of these compounds may be used in the form of compositions for enteral or parenteral use, which contain the new compounds in admixture with an organic or inorganic, solid or liquid carrier. For making up the compositions there can be employed substances which do not react with the new compounds, such as water, gelatine, lactose, starches, stearic acid, magnesium stearate, stearyl alcohol, talc, vegetable oils, benzyl alcohols, gums, tragacanth, propylene glycol, polyalkylene glycols or any other carrier suitable for such compositions. The latter may be in solid form, for example, as capsules, tablets, dragées and the like, or in liquid form, for example, as solutions, suspensions, emulsions and the like. If desired, they may contain auxiliary substances, such as preserving, stabilizing, wetting, emulsifying, coloring, flavoring agents and the like, salts for varying the osmotic pressure, buffers, etc. They may also contain, in combination, other useful substances.

The compounds of this invention are prepared according to known methods, for example, by converting a 2-[α-acyl-α-(pyridyl)-acetyl]-phenol, in which the acetyl portion has one hydrogen, and acyl is the acyl radical of an aliphatic carboxylic acid, or a tautomer thereof or a reactive oxo derivative of such compound, or a reactive ester of a 2-[α-(pyridyl)-acetyl]-phenol with an aliphatic carboxylic acid, in which the acetyl portion has two hydrogens, or a reactive oxo derivative thereof, into a 3-(pyridyl)-chromone compound by ring closure, and, if desired, converting a resulting salt into the free compound or into another salt, and/or if desired, converting a resulting compound into a salt or into a quaternary ammonium derivative thereof, and/or, if desired, converting a resulting quaternary ammonium compound into another quaternary ammonium compound.

An acyl radical of an aliphatic acid is particularly the acyl radical of an acid of the formula R—COOH, in which R has the previously given meaning. A 2-[α-acyl-α-(pyridyl)-acetyl]-phenol starting material is primarily a compound of the following formula:

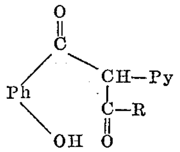

in which Ph, Py and R have the previously given meaning; these compounds may also be used in the form of their tautomers or as the reactive oxo derivatives thereof, such as the enol ethers or the enol esters.

These starting materials may be prepared according to known methods; for example, a 2-(pyridyl-acetyl)-phenol, in which the phenolic hydroxyl group may be protected, for example, etherified or esterified, or an enol derivative thereof (such as an enol ester) or a salt thereof (such as an alkali metal salt), is condensed with a reactive functional derivative of an aliphatic carboxylic acid, such as an ester, e.g., a normal ester, and ortho ester and the like (for example, esters of formic acid, e.g., ethyl formate, triethyl orthoformate and the like, or esters of other aliphatic carboxylic acids), certain amides (for example, amides of formic acid, e.g., formamide and the like, or amides of other aliphatic carboxylic acids), certain nitriles (such as an inorganic cyanide, e.g., zinc cyanide and the like, or nitriles of aliphatic carboxylic acids), or certain acid halides (for example, ethyl oxalyl chloride and the like), and yield the desired starting materials. The latter may also be prepared by reacting an acyl-methyl-pyridine, in which acyl is the acyl radical of an aliphatic carboxylic acid, and the methyl portion has two hydrogen atoms, or a salt thereof (such as an alkali metal salt) or an enol derivative thereof (such as an enol ester or an enol ether), with a reactive functional derivative of a salicylic acid, such as an ester thereof. In such reaction, the hydroxyl group of the salicylic acid is preferably protected, for example, etherified or esterified. If necessary, the protected hydroxyl group of a resulting condensation product is then liberated by hydrolysis, for example, by treatment with an acid, e.g., aqueous hydrobromic or hydriodic acid, or with a base. The above-mentioned condensation reactions are preferably carried out in the presence of a condensing agent, especially a Claisen condensation reagent, such as an alkali metal amide, hydride, or alcoholate, e.g., sodium amide, sodium hydride, or sodium or potassium methoxide, ethoxide or tertiary butoxide and the like, an organic base, e.g., piperidine and the like. They may be performed in the presence or absence of diluents, if necessary, while cooling or at an elevated temperature, in a closed vessel and/or in the atmosphere of an inert gas, e.g., nitrogen.

In the preparation of the above starting materials, the latter may be isolated; however, under the reaction conditions, they may be converted directly into the desired 3-(pyridyl)-chromone compounds without isolation or further purification.

A reactive ester of a 2-[α-(pyridyl)-acetyl]-phenol with an aliphatic carboxylic acid, which may also serve as the starting material in the process of this invention, is preferably a compound of the following formula:

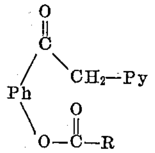

in which Ph, Py and R have the above-given meaning, or the reactive oxo derivatives, for example, the ketals, thereof. They can be prepared, for example, by esterification of 2-(pyridyl-acetyl)-phenols or salts, such as alkali metal salts, thereof, with an aliphatic carboxylic acid, especially a reactive functional derivative thereof, such as a salt, for example, an alkali metal salt of such acid, an anhydride thereof, e.g., the normal anhydride, or a mixed anhydride, a halide thereof, e.g., chloride, an ester thereof, e.g., an ortho ester, or a suitable ketene and the like, under known esterification conditions. A preferred method comprises reacting an intermediate phenol compound with an alkali metal salt of an aliphatic carboxylic acid (for example, sodium acetate and the like) in the presence of an anhydride of such acid (e.g., acetic acid anhydride and the like) according to the Kostanecki-Robinson reaction. Again, the desired starting material may be isolated or may directly be converted into the desired 3-(pyridyl)-chromone compound under the conditions for the reaction.

As mentioned previously, the above-described starting materials, for example, those of the previously given formulae, cyclize either spontaneously in the course of their manufacture, or may be cyclized. The latter is preferably carried out in the presence of catalysts, condensing agents and/or diluents, while cooling, at room temperature or at an elevated temperature, and, if necessary, in a closed vessel and/or in the atmosphere of an inert gas, e.g., nitrogen. Catalysts or condensing reagents effecting the ring closure are, for example, acidic agents, such as Friedel-Crafts reagents, e.g., aluminum chloride, boron trifluoride, stannic chloride, phosphoric acid, polyphosphoric acid, phosphorus pentoxide, sulfuric acid, hydrochloric acid and the like, or basic agents, such as organic nitrogen bases, e.g., pyridine, piperidine and the like. The selection of the appropriate diluents depends primarily on the solubility of the starting material and the nature of the ring closing reagent. Preferred inert solvents are, for example, hydrocarbons, such as hexane, benzene, toluene and the like, ethers, such as diethyl ether, p-dioxane, tetrahydrofuran and the like, carbon disulfide or any other suitable diluent. If desired, byproducts formed during the reaction, such as water, may be eliminated, for example, by azeotropic distillation.

The compounds of this invention may also be prepared by converting a 3-hydroxy-3-(pyridyl)-chroman-4-one having in the 2-position at least one hydrogen atom, or a reactive esterified derivative thereof, into the desired 3-(pyridyl)-chromone compound, and, if desired, carrying out the optional steps.

The conversion of a free or reactive esterified 3-hydroxy-3-(pyridyl)-chroman-4-one, particularly a compound of the formula:

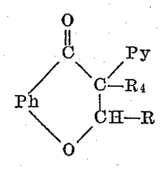

in which Ph, Py and R have the above-given meaning, and $R_4$ represents hydroxyl or reactive esterified hydroxyl, such as halogeno, e.g., chloro, bromo and the like, or an organic sulfonyloxy group, such as lower alkyl-sulfonyloxy, e.g., methyl-sulfonyloxy, ethyl-sulfonyloxy and the like, or monocyclic carbocyclic aryl-sulfonyloxy, e.g., phenyl-sulfonyloxy, 4-methyl-phenyl-sulfonyloxy and the like, into the desired 3-(pyridyl)-chromone compound can be effected by splitting off in a manner known per se a compound of the formula $R_4$—H, in which $R_4$ has the previously given meaning, i.e., water or an acid. For example, a 3-hydroxy-3-(pyridyl)-chroman-4-one having in the 2-position at least one hydrogen atom, may be heated in the presence or absence of a diluent and/or a dehydrating agent. The latter are, for example, acidic or alkaline reagents, such as sulfuric acid, polyphosphoric acid, phosphorus oxychloride, phosphorus pentoxide, calcium oxide and the like. Reactive esterified 3-hydroxy-3-(pyridyl)-chroman-4-one compounds having in the 2-position at least one hydrogen atom, may split off an acid and form the desired 3-(pyridyl)-chromone compounds by heating, for example, in a suitable organic base, such as pyridine, collidine and the like.

The above starting materials may be prepared, for example, by reacting an (α-phenyloxy-acetyl)-pyridine compound, in which the acetyl radical has at least one hydrogen atom, and one of the ortho-positions of the phenyl portion is unsubstituted, with hydrogen cyanide, converting in the resulting cyanohydrin compound the cyano group into a carboxyl group, and ring closing the resulting β-phenyloxy-α-hydroxy-a-(pyridyl)-propionic acid, in which the β-carbon has at least one hydrogen atom to form the 3-hydroxy-3-(pyridyl)-chroman-4-one compound; these reactions are carried out according to known methods and ring closure is achieved, for example, by treatment with hydrochloric acid and zinc chloride. The free hydroxyl group of a resulting 3-hydroxy-3-(pyridyl)-chroman-4-one may be converted into a reactive esterified hydroxyl group, for example, by treatment with a thionyl halide, e.g., thionyl chloride and the like, or a lower alkane sulfonic acid halide or a monocyclic carbocyclic aryl sulfonyl halide, e.g., methane sulfonic acid chloride, toluene sulfonic acid chloride and the like.

A resulting salt may be converted into the free compound, for example, by treatment with a base, such as, for example, an alkali metal hydroxide, e.g., sodium hydroxide, potassium hydroxide and the like, an alkali metal carbonate, e.g., sodium or potassium carbonate or hydrogen carbonate and the like, amomnia or any other suitable alkaline reagent, or with an anion exchange preparation and the like.

A resulting salt may be converted into another salt according to known methods; for example, an inorganic salt may be treated with an appropriate salt, e.g., sodium, potassium, barium, silver and the like, salt of an acid in the presence of a diluent, in which a resulting inorganic compound is insoluble and is thus removed from the reaction medium. Conversion of one salt into another is also achieved by treatment with a suitable anion exchange preparation.

A resulting free compound may be converted into its acid addition salts, for example, by treating it, preferably a solution of the free base in a suitable inert solvent or solvent mixture with an acid or a solution thereof, or with an anion exchange preparation and isolating the desired salt. Salts may be obtained in the form of their hydrates or may contain solvent of crystallization.

The compounds of this invention may also be converted into their quaternary ammonium derivatives, for example, by reacting the free compounds with a reactive ester of a hydroxylated compound and a strong acid, such as the previously mentioned reactive esters of lower alkanols or phenyl-lower alkanols, e.g., the lower alkyl or phenyl-lower alkyl halides, sulfates or sulfonates. The quaternizing reaction may be performed in the absence or presence of a suitable solvent, if necessary, while cooling or at an elevated temperature, under increased pressure, and/or in the atmosphere of an inert gas, e.g., nitrogen.

A resulting quaternary ammonium compound may be converted into other quaternary ammonium compounds, such as the corresponding quaternary ammonium hydroxides, for example, by reacting a quaternary ammonium halide with silver oxide, or a quaternary ammonium sulfate with barium hydroxide, or by treating a quaternary ammonium salt with an anion exchange resin, or by electrodialysis. From a resulting quaternary ammonium hydroxide, there may be prepared other quaternary ammonium salts by treatment with acids, for example, with those outlined hereinbefore for the preparation of the acid addition salts. A quaternary ammonium compound may also be converted directly into another quaternary ammonium salt without the formation of the quaternary ammonium hydroxide. For example, a quaternary ammonium sulfate may be reacted with barium chloride to yield the quaternary ammonium chloride, or a quaternary ammonium iodide may be converted into the corresponding chloride by treatment with hydrochloric acid in anhydrous methanol; anion exchange preparations may also serve as reagents to convert one quaternary ammonium compound into the other.

The invention also comprises any modification of the process wherein a compound obtainable as an intermediate at any stage of the process is used as starting material and the remaining step(s) of the process is (are) carried out or the process is discontinued at any stage or in which the starting materials are formed in the course of the reaction or used in the form of their salts.

Also included within the scope of the present invention are any new intermediates.

In the process of this invention such starting materials are preferably used which lead to final products mentioned in the beginning as preferred embodiments of the invention.

This is a continuation-in-part application of my application Serial No. 201,316, filed June 11, 1962, now abandoned.

The following examples are intended to illustrate the invention and are not to be construed as being limitations thereon. Temperatures are given in degrees centigrade.

*Example 1*

The mixture of 2.0 g. of o-hydroxy-α-(3-pyridyl)-acetophenone, 20 ml. of pyridine, 2.5 ml. of triethyl orthoformate and 15 drops of piperidine is heated in an oil bath of 120° for 12 hours and allowed to stand overnight at room temperature. The reaction mixture, containing some solid material, is diluted with diethylether and filtered to yield 1.2 g. of 3-(3-pyridyl)-chromone of the formula

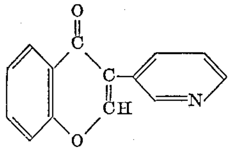

melting at 168–170°. It melts at 169–170° after recrystallization from a mixture of ethanol and hexane.

The starting material used in the above procedure is prepared as follows: To a potassium amide-ammonia solution, containing 7.8 g. (0.2 mole) of potassium and 0.15 g. of ferric nitrate nonahydrate in 350 ml. of liquid ammonia, is added while stirring 18.6 g. (0.2 mole) of 3-picoline over a period of 15 minutes; the resulting mixture is stirred and refluxed for two additional hours. The solution of 16.6 g. (0.1 mole) of methyl o-methoxy-benzoate in 17 ml. of diethylether is then added within a period of twenty minutes; stirring and refluxing is continued for one hour, and the reaction mixture is heated with 11 g. of solid ammonium chloride and diluted with 200 ml. of diethyl ether. The liquid ammonia is evaporated by allowing the reaction mixture to stand overnight in a vessel equipped with an ordinary reflux condenser. The reaction mixture is heated to boiling, then cooled and poured into a mixture of ice and concentrated hydrochloric acid. The acidic aqueous layer is extracted several times with diethyl ether (the ether extracts are discarded), and the pH is adjusted to about 8 with a 50 percent aqueous solution of sodium hydroxide and solid sodium carbonate. The slightly basic aqueous mixture is extracted three times with chloroform and once with ethyl acetate, the combined organic extracts are dried over anhydrous sodium sulfate, filtered and evaporated. After adding diethyl ether to the brown oily residue, a crystalline material is formed and filtered off to yield the colorless o-methoxy-benzoic acid amide, melting at 130–132°; yield 5.7 g. From the filtrate, 5.4 g. of the desired o-methoxy-α-(3-pyridyl)-acetophenone are isolated, which melts at 47–50° after recrystallization from a mixture of benzene and pentane.

The mixture of 3.1 g. of o-methoxy-α-(3-pyridyl)-acetophenone, 55 ml. of 48 percent aqueous hydrobromic acid and 55 ml. of glacial acetic acid is refluxed for five hours. The residue obtained after evaporation represents the o-hydroxyl-α-(3-pyridyl)-acetophenone hydrobromide which melts at 233.5–236° after recrystallization from ethanol. It is dissolved in warm water, the solution is neutralized with solid sodium hydrogen carbonate and extracted three times with diethyl ether. The organic extracts are washed with a saturated aqueous sodium chloride solution, dried over anhydrous sodium sulfate, filtered and evaporated to yield 2.0 g. of o-hydroxy-α-(3-pyridyl)-acetophenone, M.P. 47–50°.

*Example 2*

A mixture of 6.0 g. of o-hydroxy-α-(2-pyridyl)acetophenone, 60 ml. pyridine, 7.5 ml. of triethyl orthoformate and 65 drops of piperidine is heated in an oil bath to 120° for twelve hours and allowed to stand overnight at room temperature. The reaction mixture is evaporated to a volume of 15 ml.; upon addition of diethyl ether, 1.8 g. of a solid material precipitates, melting at 144–147°. The filtrate is evaporated to dryness, and the orange residue (3.3 g., M.P. 95°) is recrystallized from aqueous ethanol to yield the 3-(2-pyridyl)-chromone of the formula

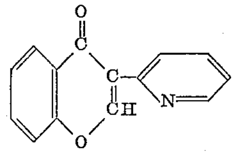

melting at 118 to 120°.

The starting material used in the above procedure is prepared as described in Example 1, i.e., 18.6 g. of 2-picoline is reacted with potassium amide and 16.6 g. of methyl o-methoxy-benzoate. The ether solution resulting after evaporating the ammonia, is poured into a mixture of ice and concentrated hydrochloric acid, the aqueous phase extracted with diethyl ether, and its pH is adjusted to about 8 with a 50 percent aqueous solution of sodium hydroxide and solid sodium carbonate. The organic material is extracted several times with chloroform; the organic extracts are combined, swirled with solid sodium chloride, dried over anhydrous sodium sulfate, filtered and evaporated. The dark brown residue is distilled under reduced pressure to yield 17.3 g. of the deep yellow o-methoxy-α-(2 pyridyl)-acetophenone, collected at 158–161°/0.1 mm.

To a mixture of 300 ml. of aqueous hydrobromic acid of 48% strength and 300 ml. of glacial acetic acid is added 16.5 g. of o-methoxy-α-(2-pyridyl)-acetophenone, and the reaction mixture is refluxed for 5 hours. After evaporating the solvent, the orange residue is dissolved in warm water, the aqueous solution is neutralized with solid sodium hydrogen carbonate, and the greenish precipitate is recrystallized from ethanol (35%) to yield 11.0 g. of the desired o-hydroxy-α-(2-pyridyl)-acetophenone in golden needles, M.P. 147–150°.

*Example 3*

A mixture of 5.0 g. of o-hydroxy-α-(4-pyridyl)-acetophenone, 45 ml. of dry pyridine, 6 ml. of triethyl orthoformate and 1 ml. of piperidine is heated to 120° for 12 hours. After cooling, the crystalline product is filtered off, washed twice with diethyl ether and dried to yield 3.6 g. of 3--(4-pyridyl)-chromone of the formula

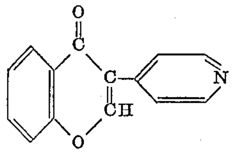

in tan colored prisms, melting at 223–225°. The analytically pure compound melts at 225–225.5° after recrystallization from ethanol.

The starting material is prepared according to the process described in Example 1 by reacting 18.6 g. of 4-picoline with potassium amide (containing 7.8 g. of potassium) and 16.6 g. of methyl o-methoxy-benzoate in a mixture of ammonia and diethyl ether. The chloroform and ethyl acetate extracts are combined and dried over anhydrous sodium sulfate, filtered and evaporated. The excess of picoline is removed by distillation under reduced pressure; a brown oily residue crystallizes and is dissolved in a mixture of benzene and petroleum ether. After standing, 3.2 g. of a solid material, melting at 180–185°, is filtered off, the filtrate is evaporated, and the residue is distilled under reduced pressure to yield 8.5 g. of o-methoxy-*a*-(4-pyridyl)-acetophenone, collected at 153–160°/0.5 mm., as a yellow oil, which crystallizes from petroleum ether, M.P. 72.5–75°.

A mixture of 8.0 g. of o-methoxy-*a*-(4-pyridyl)-acetophenone, 145 ml. of aqueous hydrobromic acid of 48% strength and 145 ml. of glacial acetic acid is refluxed for five hours, and then evaporated to dryness. The solid residue is recrystallized from ethanol yielding 4.3 g. of the yellow o-hydroxy-α-(pyridyl)-acetophenone hydrobromide. The free base is obtained by dissolving the salt in warm water, the solution is neutralized with solid sodium hydrogen carbonate, the precipitate is filtered off and recrystallized from aqueous ethanol; 6.2 g. of o-hydroxy-α-(4-pyridyl)-acetophenone is isolated which melts at 90–91°.

*Example 4*

To a suspension of 1.0 g. of 3-(4-pyridyl)-chromone in 20 ml. of water is added 1 ml. of concentrated hydrochloric acid. Upon warming to about 40–50°, a clear solution results, which is cooled for 30 minutes in an ice bath. The 3-(4-pyridyl)-chromone hydrochloride is filtered off and washed twice with acetone and once with diethyl ether, M.P. 300–315° (decomposition): yield 1.16 g.

An aqueous solution containing 5% of the above hydrochloride is prepared by adding an equal amount of citric acid to the mixture.

*Example 5*

A mixture of 5.0 g. of α-(3-pyridyl)-o,o′,p-trihydroxy-acetophenone, 25 ml. of acetic acid anhydride and 5.0 g. of anhydrous sodium acetate is refluxed for 20 hours (bath temperature 170–180°). The cold reaction mixture is poured into 200 ml. of water, and stirred for thirty minutes. The insoluble material is filtered off, and recrystallized first from ethanol (accompanied by a treatment with charcoal) and then from ethyl acetate, to yield 2.0 g. (first crop) or 5,7 - diacetoxy - 2 - methyl - 3 - (3-pyridyl)-chromone of the formula

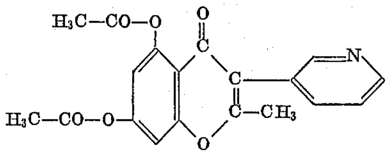

M.P. 180–181°. In contrast to the starting material, the final product gives a negative ferric chloride test.

The starting material used in the above example is prepared as follows: Dry hydrogen chloride is passed through a stirred solution of 22.0 ml. of (3-pyridyl)-acetonitrile in 50 ml. of benzene. After the formation of the salt, a suspension of 40 g. of anhydrous phloroglucinol (prepared by heating phloroglucinol at 120–130° for fifteen hours) in 50 ml. of anhydrous diethyl ether is added rapidly, followed by 16 g. of powdered anhydrous zinc chloride. The reaction mixture is stirred at room temperature for twenty-five minutes and then under reflux for 3½ hours, while dry hydrogen chloride gas is passed through the mixture. After allowing it to cool to room temperature, the solvents are decanted off, the remaining solid is added in portions to 700 ml. of water. The resulting aqueous mixture is boiled in an open beaker for 45 minutes, cooled and its pH is adjusted to about 4–5 by adding solid sodium carbonate. The mixture is heated to 85–90°, filtered rapidly, and the brown gummy mass on the filter is dissolved in 500 ml. of ethyl acetate. The solution is dried over anhydrous sodium sulfate, filtered and evaporated to dryness to yield 36.0 g. of crude α-(3-pyridyl)-o,o′,p-trihydroxy-acetophenone, which melts at 250–251° after several recrystallizations from aqueous methanol.

To a mixture of 1.0 g. of α-(3-pyridyl)-o,o′,p-trihydroxy-acetophenone in 10 ml. of water is added dropwise concentrated aqueous hydrochloric acid until a clear solution is formed. After cooling it in an ice bath for thirty minutes, the precipitate is filtered off and washed twice with acetone; the pure α-(3-pyridyl)-o,o′,p-trihydroxy-acetophenone hydrochloride melts at 275–276°; yield: 0.82 g.

*Example 6*

A mixture of 2.0 g. of o-hydroxy-α-(4-pyridyl)-acetophenone, 2.0 g. of anhydrous sodium acetate and 10 ml. of acetic acid anhydride is refluxed for 20 hours (bath temperature 190–200°). The reaction mixture is poured into water while stirring, and solid sodium carbonate is added in small portions until the pH is about 6–7. The tan colored precipitate is collected and recrystallized twice from ethyl acetate (with charcoal treatment), to yield 1.45 g. of 2-methyl-3-(4-pyridyl)-chomone of the formula

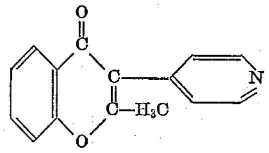

which melts at 168–169°.

Other compounds, which may be prepared according to the procedure of this invention, are, for example, 7-chloro - 3 - (3 - pyridyl) - chromone, 5,7-dimethyl-3-(3-pyridyl) - chromone, 5-methoxy-3-(4-pyridyl)-chromone and the like.

*Example 7*

A mixture of 0.5 g. of o,p-dihydroxy-α-(3-pyridyl)-acetophenone, 6 ml. of pyridine, 1 ml. of methyl orthoformate and 7 drops of piperidine is heated at 120° for twenty hours and then cooled to room temperature. The crystalline precipitate is filtered off, washed with ethyl acetate (yield: 0.5 g.) and recrystallized from N-acetyl-N,N-dimethylamine and water to yield the 7-hydroxy-3-(3-pyridyl)-chromone of the formula

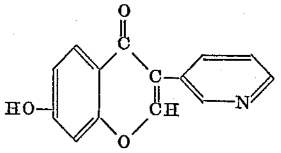

which melts at 325–326°.

The starting material used in the above procedure is prepared as follows: A mixture of 10.0 g. of sublimed resorcinol in 100 ml. of benzene, 10 g. of 3-pyridyl-acetonitrile and 25 ml. of diethyl ether is colored in an ice-bath and treated with 7.0 g. of powdered, freshly melted zinc while stirring. Dry hydrogen chloride gas is passed over the surface, whereupon a viscous precipitate is formed which gradually solidifies. After two hours, the reaction mixture is heated to 30–40°, and is then allowed to stand at room temperature for two days. After adding 100 ml. of water and 2.5 ml. of concentrated hydrochloric acid, it is boiled for 30–40 minutes, then cooled in an ice-bath and neutralized with a 40 percent aqueous solution of sodium hydroxide. The pH is adjusted to about 4 with acetic acid; an oily product precipitates which is collected by decanting the supernatant solution and dissolved in 95 percent ethanol. After stirring at room temperature for two hours, the solid precipitate is filtered off and discarded; the filtrate is evaporated to yield 18.5 g. of a viscous oil which is stirred with ethyl acetate. The insoluble material is filtered off and discarded; the filtrate is washed with water, dried over anhydrous sodium sulfate and evaporated. The residual oil is subjected to distillation; the fraction collected at 100–130°/0.08 mm.

shows a negative ferric chloride test and is discarded, and the residue (ferric chloride positive; yield: 7.2 g.) is dissolved in warm 95 percent ethanol. The solution is filtered, the filtrate is evaporated, and the residue is taken up in 50 ml. of concentrated aqueous hydrobromic acid. The acidic solution is evaporated to dryness to yield 2.17 g. of o',p'-dihydroxy-α-(3-pyridyl)-acetophenone hydrobromide, which melts at 275–277° after recrystallization from 95 percent ethanol.

The three o',p' - dihydroxy - α - (3-pyridyl) - acetophenone is obtained by dissolving the hydrobromide in water, neutralizing the solution with sodium hydrogen carbonate and collecting the free compound M.P. 209–210°.

What is claimed is:

1. A member selected from the group consisting of a compound of the formula

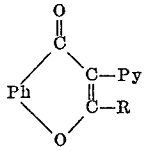

in which Ph is a member selected from the group consisting of 1,2-phenylene, (lower alkyl)-1,2-phenylene, (trifluoromethyl) - 1,2-phenylene, (hydroxy)-1,2-phenylene, (lower alkoxy)-1,2-phenylene, (lower alkylenedioxy)-1,2-phenylene, (halogeno)-1,2-phenylene and (lower alkanoyloxy)-1,2-phenylene, Py is a member selected from the group consisting of pyridyl and (lower alkyl)-pyridyl, and R is a member selected from the group consisting of hydrogen and lower alkyl, acid addition salts thereof and lower alkyl quaternary ammonium salts thereof.

2. A compound of the formula

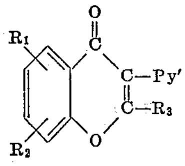

in which each of the groups $R_1$ and $R_2$ is hydrogen, $R_3$ is hydrogen, and Py' is pyridyl.

3. A compound of the formula

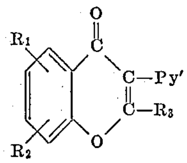

in which each of the groups $R_1$ and $R_2$ is hydrogen, $R_3$ is lower alkyl, and Py' is pyridyl.

4. 3-(3-pyridyl)-chromone.

5. A pharmaceutically acceptable, non-toxic acid addition salt of 3-(3-pyridyl)-chromone.

6. 3-(2-pyridyl)-chromone.

7. 3-(4-pyridyl)-chromone.

8. A pharmaceutically acceptable, non-toxic acid addition salt of 3-(4-pyridyl)-chromone.

9. 5,7-diacetoxy-2-methyl-3-(3-pyridyl)-chromone.

10. 2-methyl-3-(4-pyridyl)-chromone.

11. 7-hydroxy-3-(3-pyridyl)-chromone.

References Cited by the Examiner

FOREIGN PATENTS

| | | |
|---|---|---|
| 728,767 | 4/55 | Great Britain. |
| 70,267 | 6/52 | Netherlands. |

OTHER REFERENCES

Devitt et al.: J. Org. Chem., vol. 26, pp. 4941–4 (1961).

Pasheco et al.: "Bull. Soc. Chim. France" (1960), pp. 95–8.

Schmutz et al.: "Helv. Chim. Acta," vol. 36, pp. 620–26 (1953).

IRVING MARCUS, *Primary Examiner.*

NICHOLAS S. RIZZO, *Examiner.*

UNITED STATES PATENT OFFICE

CERTIFICATE OF CORRECTION

Patent No. 3,178,442 April 13, 1965

William Laszlo Bencze

It is hereby certified that error appears in the above numbered patent requiring correction and that the said Letters Patent should read as corrected below.

Column 4, line 67, for "ketene" read -- ketone --; column 9, line 31, for "prepared" read -- converted --; column 10, line 57, for "zinc" read -- zinc chloride --.

Signed and sealed this 28th day of September 1965.

(SEAL)
Attest:

ERNEST W. SWIDER
Attesting Officer

EDWARD J. BRENNER
Commissioner of Patents